(12) United States Patent
Wittkopp et al.

(10) Patent No.: US 8,133,148 B2
(45) Date of Patent: Mar. 13, 2012

(54) MULTI-SPEED TRANSMISSION HAVING FOUR PLANETARY GEAR SETS

(75) Inventors: Scott H. Wittkopp, Ypsilanti, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 499 days.

(21) Appl. No.: 12/372,257

(22) Filed: Feb. 17, 2009

(65) Prior Publication Data

US 2010/0210399 A1   Aug. 19, 2010

(51) Int. Cl.
*F16H 3/62* (2006.01)
(52) U.S. Cl. ..................................................... 475/275
(58) Field of Classification Search ................. None
See application file for complete search history.

(56) References Cited

U.S. PATENT DOCUMENTS

| | | | | |
|---|---|---|---|---|
| 2,478,869 | A | * | 8/1949 | Hasbany ........................ 475/284 |
| 4,224,838 | A | * | 9/1980 | Roushdy et al. ................ 475/55 |
| 4,229,996 | A | * | 10/1980 | Hildebrand ..................... 475/55 |
| 5,919,111 | A | * | 7/1999 | Park .............................. 475/269 |
| 5,993,347 | A | * | 11/1999 | Park .............................. 475/280 |
| 6,558,287 | B2 | | 5/2003 | Hayabuchi et al. |
| 7,101,305 | B2 | | 9/2006 | Tabata et al. |
| 7,163,484 | B2 | | 1/2007 | Klemen |
| 2005/0090362 | A1 | | 4/2005 | Abe et al. |
| 2006/0270513 | A1 | | 11/2006 | Klemen |
| 2006/0270516 | A1 | | 11/2006 | Klemen |
| 2010/0041507 | A1 | * | 2/2010 | Gumpoltsberger et al. .. 475/275 |
| 2010/0041509 | A1 | * | 2/2010 | Gumpoltsberger et al. .. 475/275 |
| 2010/0190601 | A1 | * | 7/2010 | Phillips ......................... 475/275 |
| 2011/0009228 | A1 | * | 1/2011 | Bauknecht et al. ........... 475/275 |
| 2011/0009229 | A1 | * | 1/2011 | Bauknecht et al. ........... 475/275 |

* cited by examiner

*Primary Examiner* — Dirk Wright

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes.

33 Claims, 6 Drawing Sheets

| GEAR STATE | GEAR RATIO | RATIO STEP | TORQUE TRANSMITTING ELEMENTS ||||| 
|---|---|---|---|---|---|---|---|
| | | | 32 | 34 | 28 | 30 | 26 |
| Rev | -4.222 | | X | X | | | X |
| N | | -0.90 | O | O | | | |
| 1st | 4.667 | | X | X | | X | |
| 2nd | 3.111 | 1.50 | X | X | X | | |
| 3rd | 2.154 | 1.44 | | X | X | X | |
| 4th | 1.714 | 1.26 | | X | X | | X |
| 5th | 1.273 | 1.35 | | X | | X | X |
| 6th | 1.000 | 1.27 | | | X | X | X |
| 7th | 0.857 | 1.17 | X | | | X | X |
| 8th | 0.667 | 1.29 | X | | X | | X |

X= ON, CARRYING TORQUE
O= ON, NOT CARRYING TORQUE

FIG. 3

| GEAR STATE | GEAR RATIO | RATIO STEP | TORQUE TRANSMITTING ELEMENTS ||||| 
|---|---|---|---|---|---|---|---|
| | | | 132 | 134 | 128 | 130 | 126 |
| Rev | -3.611 | | X | X | | | X |
| N | | -0.77 | O | O | | | |
| 1st | 4.677 | | X | X | | X | |
| 2nd | 3.111 | 1.50 | X | X | X | | |
| 3rd | 2.154 | 1.44 | | X | X | X | |
| 4th | 1.714 | 1.26 | | X | X | | X |
| 5th | 1.291 | 1.33 | | X | | X | X |
| 6th | 1.000 | 1.29 | | | X | X | X |
| 7th | 0.846 | 1.18 | X | | | X | X |
| 8th | 0.667 | 1.27 | X | | X | | X |

X= ON, CARRYING TORQUE
O= ON, NOT CARRYING TORQUE

FIG. 6

| GEAR STATE | GEAR RATIO | RATIO STEP | TORQUE TRANSMITTING ELEMENTS ||||| 
|---|---|---|---|---|---|---|---|
| | | | 232 | 234 | 228 | 230 | 226 |
| Rev | -3.627 | | X | X | | | X |
| N | | -0.77 | O | O | | | |
| 1st | 4.680 | | X | X | | X | |
| 2nd | 3.120 | 1.50 | X | X | X | | |
| 3rd | 1.828 | 1.44 | | X | X | X | |
| 4th | 1.453 | 1.26 | | X | X | | X |
| 5th | 1.190 | 1.33 | | X | | X | X |
| 6th | 1.000 | 1.29 | | | X | X | X |
| 7th | 0.846 | 1.18 | X | | | X | X |
| 8th | 0.667 | 1.27 | X | | X | | X |

X= ON, CARRYING TORQUE
O= ON, NOT CARRYING TORQUE

FIG. 9

MULTI-SPEED TRANSMISSION HAVING FOUR PLANETARY GEAR SETS

FIELD

The invention relates generally to a multiple speed transmission having a plurality of planetary gear sets and a plurality of torque transmitting devices, and more particularly to a transmission having eight speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In one embodiment, the transmission includes an input member, an output member, first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to at least one of the second member of the first planetary gear set and the second member of the third planetary gear set. A first interconnecting member continuously interconnects the first member of the first planetary gear set with the second member of the fourth planetary gear set, a second interconnecting member continuously interconnects the second member of the first planetary gear set with the second member of the third planetary gear set, a third interconnecting member continuously interconnects the third member of the first planetary gear set with the third member of the second planetary gear set, and a fourth interconnecting member continuously interconnects the first member of the second planetary gear set with the third member of the third planetary gear set. A first torque transmitting mechanism is selectively engageable to interconnect the first member of the third planetary gear set with the third member of the fourth planetary gear set. A second torque transmitting mechanism is selectively engageable to interconnect at least one of the first member of the second planetary gear set and the third member of the third planetary gear set with the third member of the fourth planetary gear set. A third torque transmitting mechanism is selectively engageable to interconnect at least one of the input member and the second member of the second planetary gear set with the third member of the fourth planetary gear set. A fourth torque transmitting mechanism is selectively engageable to interconnect at least one of the third member of the first planetary gear set and the third member of the second planetary gear set with a stationary member. A fifth torque transmitting mechanism is selectively engageable to interconnect the first member of the fourth planetary gear set with the stationary member. The torque transmitting mechanisms are selectively engageable in combinations of at least three to establish at least eight forward speed ratios and at least one reverse speed ratio between the input member and the output member.

In another embodiment, the transmission includes an input member, an output member, first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to at least one of the second member of the first planetary gear set and the first member of the third planetary gear set. A first interconnecting member continuously interconnects the first member of the first planetary gear set with the second member of the fourth planetary gear set, a second interconnecting member continuously interconnects the second member of the first planetary gear set with the first member of the third planetary gear set, a third interconnecting member continuously interconnects the third member of the first planetary gear set with the third member of the second planetary gear set, and a fourth interconnecting member continuously interconnects the first member of the second planetary gear set with the third member of the third planetary gear set. A first torque transmitting mechanism is selectively engageable to interconnect the second member of the third planetary gear set with the third member of the fourth planetary gear set. A second torque transmitting mechanism is selectively engageable to interconnect at least one of the first member of the second planetary gear set and the third member of the third planetary gear set with the third member of the fourth planetary gear set. A third torque transmitting mechanism is selectively engageable to interconnect at least one of the input member and the second member of the second planetary gear set with the third member of the fourth planetary gear set. A fourth torque transmitting mechanism is selectively engageable to interconnect at least one of the third member of the first planetary gear set and the third member of the second planetary gear set with a stationary member. A fifth torque transmitting mechanism is selectively engageable to interconnect the first member of the fourth planetary gear set with the stationary member. The torque transmitting mechanisms are selectively engageable in combinations of at least three to establish at least eight forward speed ratios and at least one reverse speed ratio between the input member and the output member.

In yet another embodiment, the transmission includes an input member, an output member, first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to the second member of the first planetary gear set. A first interconnecting member continuously interconnects the first member of the first planetary gear set with the second member of the fourth planetary gear set, a second interconnecting member continuously interconnects the first member of the third planetary gear set with the third member of the fourth planetary gear set, a third interconnecting member continuously interconnects the third member of the first planetary gear set with the third member of the second planetary gear set, and a fourth interconnecting member continuously interconnects the first member of the second planetary gear set with the third member of the third planetary gear set. A first torque transmitting mechanism is selectively engageable to interconnect at least one of the output member and the second member of the first planetary gear set with the second member of the third planetary gear set. A second torque transmitting mechanism is selectively engageable to interconnect at least one of the third member of the third planetary gear set and the first member of the second planetary gear set with the second member of the third planetary gear set. A third torque transmitting mechanism is selectively engageable to interconnect at least one of the input member and the second member of the second planetary gear set with the third member of the fourth planetary gear set. A fourth torque transmitting mechanism is selectively engageable to interconnect at least one of the third member of the first planetary gear set and the third member of the second planetary gear set with a stationary member. A fifth torque transmitting mechanism is selectively engageable to interconnect the first member of the fourth planetary gear set with the stationary member. The torque transmitting mechanisms are selectively engageable in combinations of at least three to establish at least eight forward speed ratios and at least one reverse speed ratio between the input member and the output member.

In one aspect of the present invention, each of the planetary gear sets has a sun gear, carrier and ring gear members.

In another aspect of the present invention, the torque transmitting devices include three clutches and two brakes.

In yet another aspect of the present invention, the transmission is a front wheel drive transmission.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting mechanisms in each of the available forward and reverse speeds or gear ratios of the transmission illustrated in FIGS. 1 and 2;

FIG. 6 is a truth table presenting the state of engagement of the various torque transmitting mechanisms in each of the available forward and reverse speeds or gear ratios of the transmission illustrated in FIGS. 4 and 5;

FIG. 9 is a truth table presenting the state of engagement of the various torque transmitting mechanisms in each of the available forward and reverse speeds or gear ratios of the transmission illustrated in FIGS. 7 and 8.

DETAILED DESCRIPTION

The following description is merely exemplary in nature and is not intended to limit the present disclosure, application, or uses.

Figure 1:
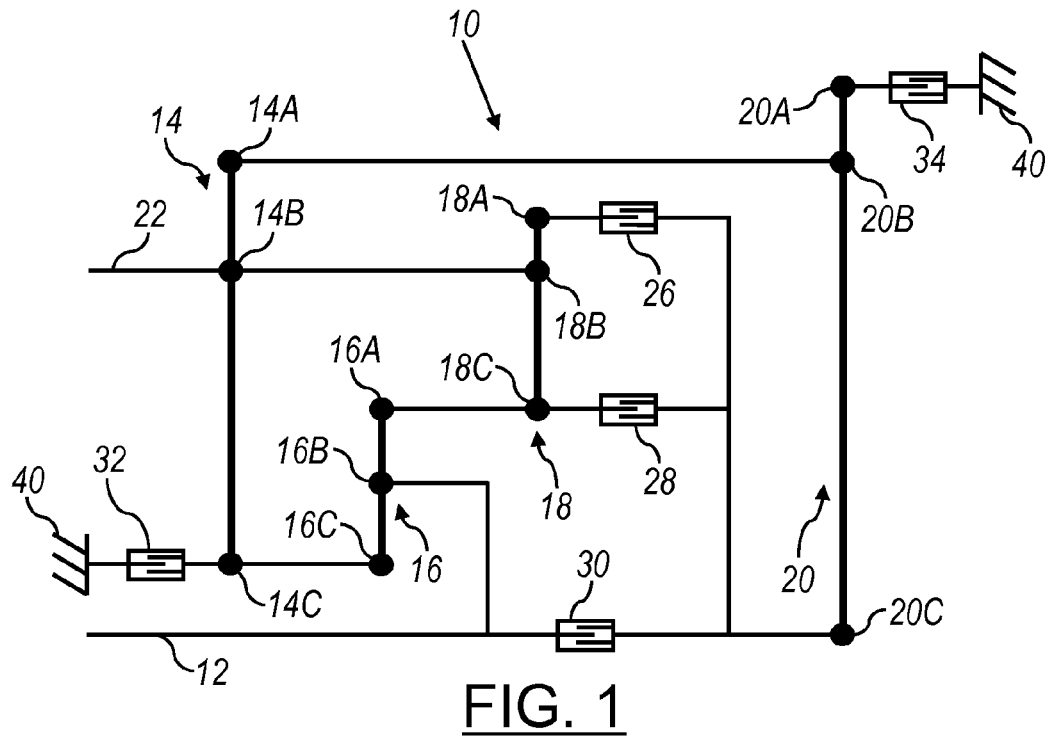
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input shaft or member 12 is coupled to the second node 16B of the second planetary gear set 16. The output shaft or member 22 is coupled to the second node 14B of the first planetary gear set 14. The first node 14A of the first planetary gear set 14 is coupled to the second node 20B of the fourth planetary gear set 20. The second node 14B of the first planetary gear set 14 is coupled to the second node 18B of the third planetary gear set 18. The third node 14C of the first planetary gear set 14 is coupled to the third node 16C of the second planetary gear set 16. The first node 16A of the second planetary gear set 16 is coupled to the third node 18C of the third planetary gear set 18.

A first clutch 26 selectively connects the first node 18A of the third planetary gear set 18 with the third node 20C of the fourth planetary gear set 20. A second clutch 28 selectively connects the first node 16A of the second planetary gear set 16 and the third node 18C of the third planetary gear set 18 with the third node 20C of the fourth planetary gear set 20. A third clutch 30 selectively connects the second node 16B of the second planetary gear set 16 and the input member 12 with the third node 20C of the fourth planetary gear set 20. A first brake 32 selectively connects the third node 14C of the first planetary gear set 14 with a ground, a stationary member, or a transmission housing 40. A second brake 34 selectively connects the first node 20A of the fourth planetary gear set 20 with the ground, the stationary member, or the transmission housing 40.

Figure 2:
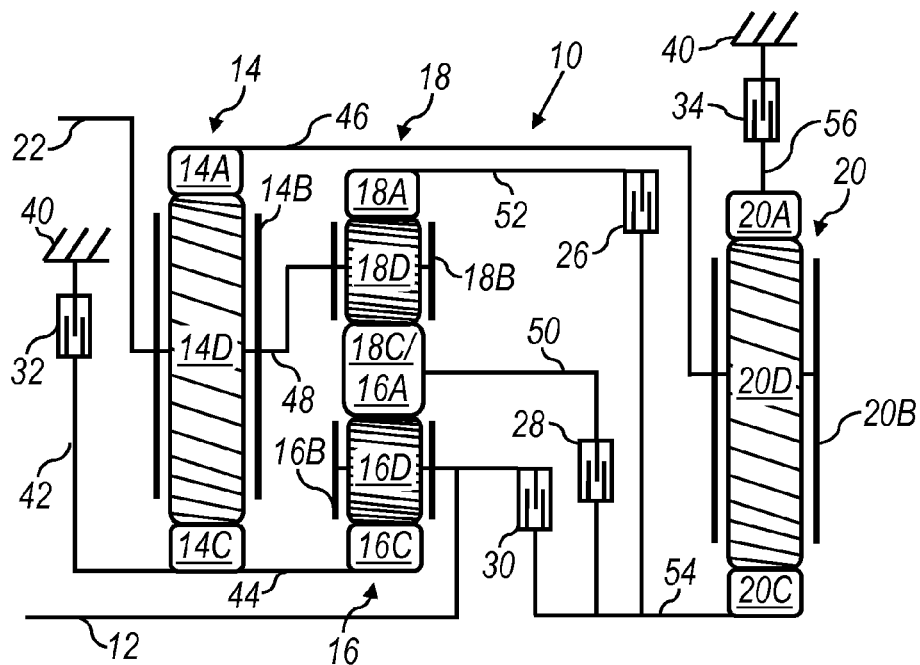
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42 and with a second shaft or interconnecting member 44. The ring gear member 14A is connected for common rotation with a third shaft or interconnecting member 46. The planet carrier member 14B is connected for common rotation with a fourth shaft or interconnecting member 48 and with the output member 22. The planet gears 14D each are configured to intermesh with both the sun gear member 14C and the ring gear member 14A.

The planetary gear set 16 includes a sun gear member 16C, a ring gear member 16A and a planet gear carrier member 16B that rotatably supports a set of planet gears 16D (only one of which is shown). The sun gear member 16C is connected for common rotation with the second shaft or interconnecting member 44. The ring gear member 16A is connected for common rotation with a fifth shaft or interconnecting member 50. The planet carrier member 16B is connected for common rotation with the input member 12. The planet gears 16D each are configured to intermesh with both the sun gear member 16C and the ring gear member 16A.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with the fifth shaft or interconnecting member 50. The ring gear member 18A is connected for common rotation with a sixth shaft or interconnecting member 52. The planet carrier member 18B is connected for common rotation with the fourth shaft or interconnecting member 48. The planet gears 18D each are configured to intermesh with both the sun gear member 18C and the ring gear member 18A.

The planetary gear set 20 includes a sun gear member 20C, a ring gear member 20A and a planet gear carrier member 20B that rotatably supports a set of planet gears 20D (only one of which is shown). The sun gear member 20C is connected for common rotation with a seventh shaft or interconnecting member 54. The ring gear member 20A is connected for common rotation with an eighth shaft or interconnecting member 56. The planet carrier member 20B is connected for common rotation with the third shaft or interconnecting member 46. The planet gears 20D each are configured to intermesh with both the sun gear member 20C and the ring gear member 20A.

In the preferred embodiment of the present invention, the sun gear member 18C is integrally formed with the ring gear member 16A of the planetary gear set 16 such that the sun gear member 18C is located on the outer surface and the ring gear member 16A is located on the inner surface of the same member. Moreover, the sun gear member 18C defines an internal cavity and the planetary gear set 16 is disposed within the internal cavity (i.e., the planetary gear set 18 is radially stacked with the planetary gear set 16 such that the planetary gear set 16 is nested within the planetary gear set 18). However, it should be appreciated that the sun gear member 18C and the ring gear member 16A may be separate components connected by an interconnecting member without departing from the scope of the present invention.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, and 30 and brakes 32 and 34 allow for selective interconnection of the shafts or interconnecting members, members of the planetary gear sets and the housing. For example, the first clutch 26 is selectively engageable to connect the sixth shaft or interconnecting member 52 with the seventh shaft or interconnecting member 54. The second clutch 28 is selectively engageable to connect the fifth shaft or interconnecting member 50 with the seventh shaft or interconnecting member 54. The third clutch 30 is selectively engageable to connect the input shaft or member 12 with the seventh shaft or interconnecting member 54. The first brake 32 is selectively engageable to connect the first shaft or interconnecting member 42 and the second shaft or interconnecting member 44 with the stationary member or the transmission housing 40 in order to restrict the members 42, 44 from rotating relative to the transmission housing 40. The second brake 34 is selectively engageable to connect the eighth shaft or interconnecting member 56 with the stationary member or the transmission housing 40 in order to restrict the eighth interconnecting member 56 from rotating relative to the transmission housing 40.

Referring now to FIG. 2 and FIG. 3, the operation of the embodiment of the eight speed transmission 10 will be described. It will be appreciated that transmission 10 is capable of transmitting torque from the input shaft or member 12 to the output shaft or member 22 in at least eight forward speed or torque ratios and at least one reverse speed or torque ratio with single transition sequential shifts and a double overdrive. Each forward and reverse speed or torque ratio is attained by engagement of one or more of the torque-transmitting mechanisms (i.e. first clutch 26, second clutch 28, third clutch 30, first brake 32 and second brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, the first clutch 26, first brake 32 and second brake 34 are engaged or activated. For example, the first clutch 26 connects the sixth shaft or interconnecting member 52 with the seventh shaft or interconnecting member 54. The first brake 32 connects the first shaft or interconnecting member 42 and the second shaft or interconnecting member 44 with the stationary member or the transmission housing 40 in order to restrict the members 42, 44 from rotating relative to the transmission housing 40. The second brake 34 connects the eighth shaft or interconnecting member 56 with the stationary member or the transmission housing 40 in order to restrict the eighth interconnecting member 56 from rotating relative to the transmission housing 40. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 4:
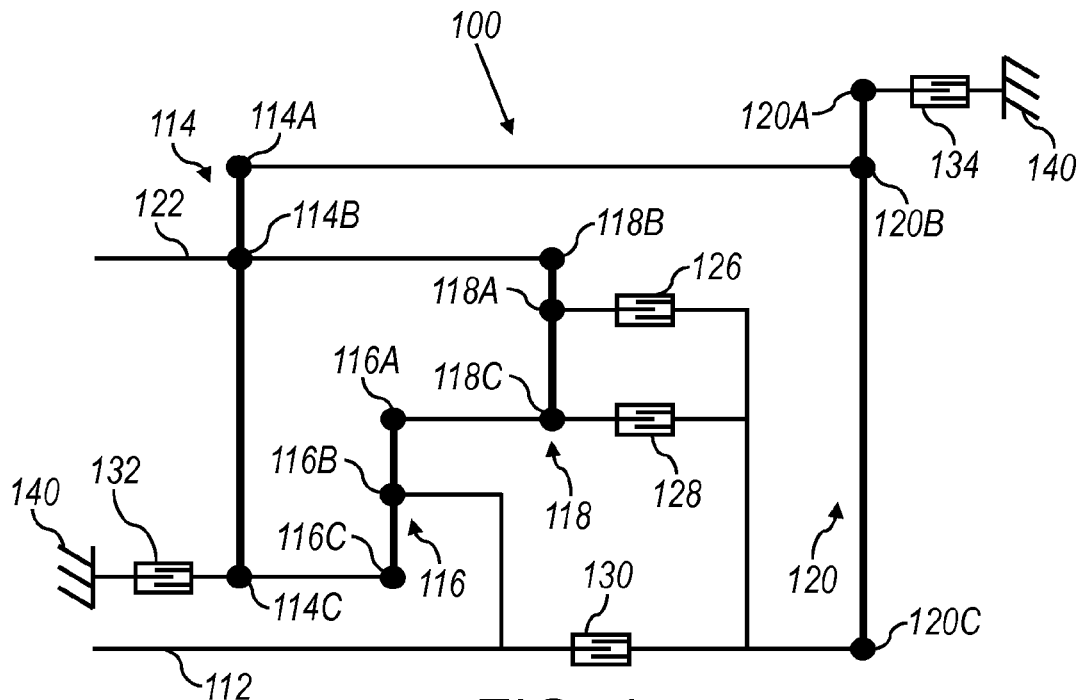
FIG. 4 is a lever diagram of an embodiment of an eight speed transmission according to the present invention.

Referring now to FIG. 4, another embodiment of an eight speed transmission 100 is illustrated in a lever diagram format. The transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The input shaft or member 112 is coupled to the second node 116B of the second planetary gear set 116. The output shaft or member 122 is coupled to the second node 114B of the first planetary gear set 114. The first node 114A of the first planetary gear set 114 is coupled to the second node 120B of the fourth planetary gear set 120. The second node 114B of the first planetary gear set 114 is coupled to the first node 118A of the third planetary gear set 118. The third node 114C of the first planetary gear set 114 is coupled to the third node 116C of the second planetary gear set 116. The first node 116A of the second planetary gear set 116 is coupled to the third node 118C of the third planetary gear set 118.

A first clutch 126 selectively connects the second node 118B of the third planetary gear set 118 with the third node 120C of the fourth planetary gear set 120. A second clutch 128 selectively connects the first node 116A of the second planetary gear set 116 and the third node 118C of the third planetary gear set 118 with the third node 120C of the fourth planetary gear set 120. A third clutch 130 selectively connects the second node 116B of the second planetary gear set 116 and the input member 112 with the third node 120C of the fourth planetary gear set 120. A first brake 132 selectively connects the third node 114C of the first planetary gear set 114 with a ground, stationary member, or a transmission housing 140. A second brake 134 selectively connects the first node 120A of the fourth planetary gear set 120 with the ground, the stationary member, or the transmission housing 140.

Figure 5:
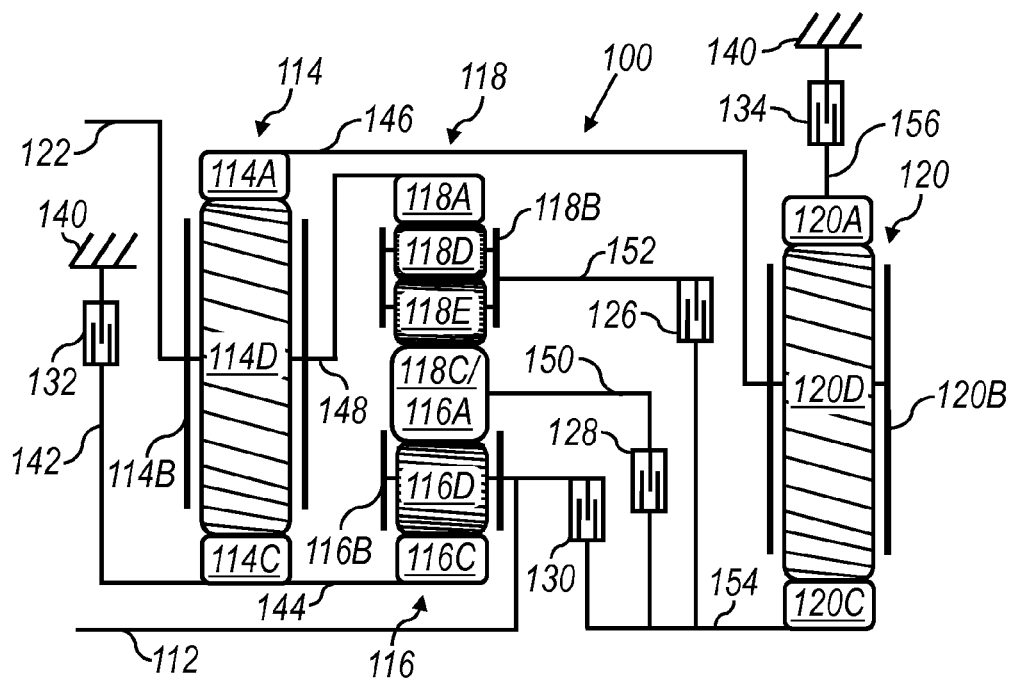
FIG. 5 is a diagrammatic view of an embodiment of an eight speed transmission according to the present invention.

Referring now to FIG. 5, a stick diagram presents a schematic layout of the embodiment of the eight speed transmission 100 according to the present invention. In FIG. 5, the numbering from the lever diagram of FIG. 4 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114C, a ring gear member 114A and a planet gear carrier member 114B that rotatably supports a set of planet gears 114D (only one of which is shown). The sun gear member 114C is connected for common rotation with a first shaft or interconnecting member 142 and with a second shaft or interconnecting member 144. The ring gear member 114A is connected for common rotation with a third shaft or interconnecting member 146. The planet carrier member 114B is connected for common rotation with a fourth shaft or interconnecting member 148 and with the output member 122. The planet gears 114D each are configured to intermesh with both the sun gear member 114C and the ring gear member 114A.

The planetary gear set 116 includes a sun gear member 116C, a ring gear member 116A and a planet gear carrier member 116B that rotatably supports a set of planet gears 116D (only one of which is shown). The sun gear member 116C is connected for common rotation with the second shaft or interconnecting member 144. The ring gear member 116A is connected for common rotation with a fifth shaft or interconnecting member 150. The planet carrier member 116B is connected for common rotation with the input member 112. The planet gears 116D each are configured to intermesh with both the sun gear member 116C and the ring gear member 116A.

The planetary gear set 118 includes a sun gear member 118C, a ring gear member 118A and a planet gear carrier member 118B that rotatably supports a first set of planet gears 118D (only one of which is shown) and a second set of planet gears 118E (only one of which is shown). The sun gear member 118C is connected for common rotation with the fifth shaft or interconnecting member 150. The ring gear member 118A is connected for common rotation with the fourth shaft or interconnecting member 148. The planet carrier member 118B is connected for common rotation with a sixth shaft or interconnecting member 152. The planet gears 118D each are configured to intermesh with both the ring gear member 118A and the planet gears 118E. The planet gears 118E each are configured to intermesh with both the sun gear member 118C and the planet gears 118D.

The planetary gear set 120 includes a sun gear member 120C, a ring gear member 120A and a planet gear carrier member 120B that rotatably supports a set of planet gears 120D (only one of which is shown). The sun gear member 120C is connected for common rotation with a seventh shaft or interconnecting member 154. The ring gear member 120A is connected for common rotation with an eighth shaft or interconnecting member 156. The planet carrier member 120B is connected for common rotation with the third shaft or interconnecting member 146. The planet gears 120D each are configured to intermesh with both the sun gear member 120C and the ring gear member 120A.

In the preferred embodiment of the present invention, the sun gear member 118C is integrally formed with the ring gear member 116A of the planetary gear set 116 such that the sun gear member 118C is located on an outer surface and the ring gear member 116A is located on an inner surface of the same member. Moreover, the sun gear member 118C defines an internal cavity and the planetary gear set 116 is disposed within the internal cavity (i.e., the planetary gear set 118 is radially stacked with the planetary gear set 116 such that the planetary gear set 116 is nested within the planetary gear set 118). However, it should be appreciated that the sun gear member 118C and the ring gear member 116A may be separate components connected by an interconnecting member without departing from the scope of the present invention.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 126, 128, and 130 and brakes 132 and 134 allow for selective interconnection of the shafts or interconnecting members, members of the planetary gear sets and the housing. For example, the first clutch 126 is selectively engageable to connect the sixth shaft or interconnecting member 152 with the seventh shaft or interconnecting member 154. The second clutch 128 is selectively engageable to connect the fifth shaft or interconnecting member 150 with the seventh shaft or interconnecting member 154. The third clutch 130 is selectively engageable to connect the input shaft or member 112 with the seventh shaft or interconnecting member 154. The first brake 132 is selectively engageable to connect the first shaft or interconnecting member 142 and the second shaft or interconnecting member 144 with the stationary member or the transmission housing 140 in order to restrict the members 142, 144 from rotating relative to the transmission housing 140. The second brake 134 is selectively engageable to connect the eighth shaft or interconnecting member 156 with the stationary member or the transmission housing 140 in order to restrict the eighth interconnecting member 156 from rotating relative to the transmission housing 140.

Referring now to FIG. 5 and FIG. 6, the operation of the embodiment of the eight speed transmission 100 will be described. It will be appreciated that transmission 100 is capable of transmitting torque from the input shaft or member 112 to the output shaft or member 122 in at least eight forward speed or torque ratios and at least one reverse speed or torque ratio with single transition sequential shifts and a double overdrive. Each forward and reverse speed or torque ratio is attained by engagement of one or more of the torque-transmitting mechanisms (i.e. first clutch 126, second clutch 128, third clutch 130, first brake 132 and second brake 134), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, the first clutch 126, first brake 132 and second brake 134 are engaged or activated. For example, the first clutch 126 connects the sixth shaft or interconnecting member 152 with the seventh shaft or interconnecting member 154. The first brake 132 connects the first shaft or interconnecting member 142 and the second shaft or interconnecting member 144 with the stationary member or the transmission housing 140 in order to restrict the members 142, 144 from rotating relative to the transmission housing 140. The second brake 134 connects the eighth shaft or interconnecting member 156 with the stationary member or the transmission housing 140 in order to restrict the eighth interconnecting member 156 from rotating relative to the transmission housing 140. Likewise, the eight forward ratios are achieved through different combinations of clutch and brake engagement, as shown in FIG. 6.

It will be appreciated that the foregoing explanation of operation and gear states of the eight speed transmission 100 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 7:
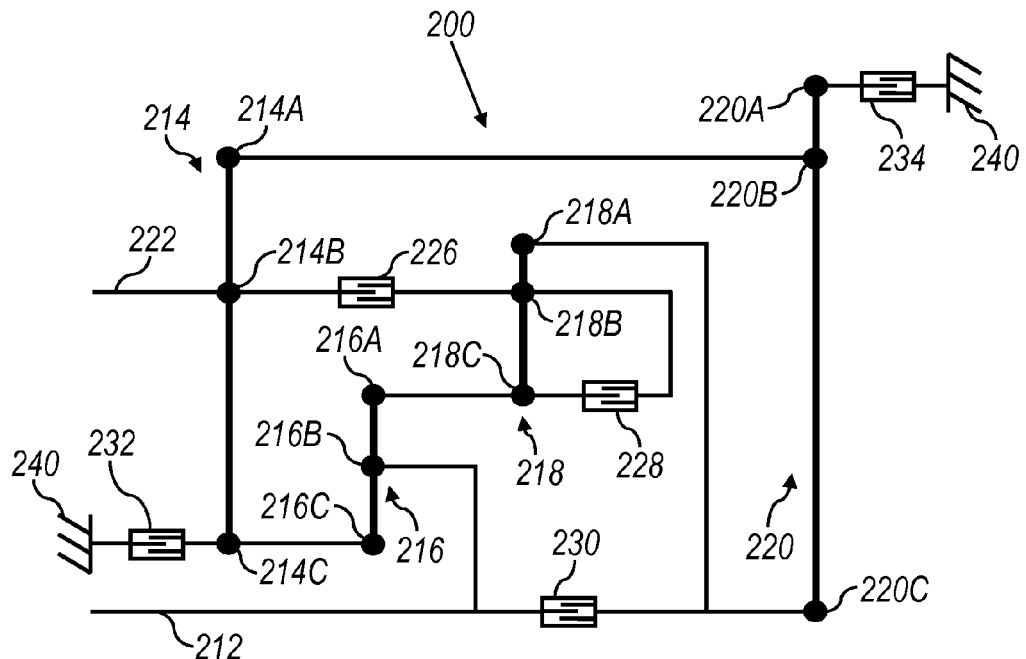
FIG. 7 is a lever diagram of an embodiment of an eight speed transmission according to the present invention.

Referring now to FIG. 7, another embodiment of an eight speed transmission 200 is illustrated in a lever diagram format. The transmission 200 includes an input shaft or member 212, a first planetary gear set 214 having three nodes: a first node 214A, a second node 214B and a third node 214C, a second planetary gear set 216 having three nodes: a first node 216A, a second node 216B and a third node 216C, a third planetary gear set 218 having three nodes: a first node 218A, a second node 218B and a third node 218C, a fourth planetary gear set 220 having three nodes: a first node 220A, a second node 220B and a third node 220C and an output shaft or member 222.

The input shaft or member 212 is coupled to the second node 216B of the second planetary gear set 216. The output shaft or member 222 is coupled to the second node 214B of the first planetary gear set 214. The first node 214A of the first planetary gear set 214 is coupled to the second node 220B of the fourth planetary gear set 220. The first node 218A of the third planetary gear set 218 is coupled to the third node 220C of the fourth planetary gear set 220. The third node 214C of the first planetary gear set 214 is coupled to the third node 216C of the second planetary gear set 216. The first node 216A of the second planetary gear set 216 is coupled to the third node 218C of the third planetary gear set 218.

A first clutch 226 selectively connects the second node 214B of the first planetary gear set 214 and the output member 222 with the second node 218B of the third planetary gear set 218. A second clutch 228 selectively connects the first node 216A of the second planetary gear set 216 and the third node 218C of the third planetary gear set 218 with the second node 218B of the third planetary gear set 218. A third clutch 230 selectively connects the second node 216B of the second planetary gear set 216 and the input member 212 with the third node 220C of the fourth planetary gear set 220. A first brake 232 selectively connects the third node 214C of the first planetary gear set 214 with a ground, a stationary member, or a transmission housing 240. A second brake 234 selectively connects the first node 220A of the fourth planetary gear set 220 with the ground, the stationary member, or the transmission housing 240.

Figure 8:
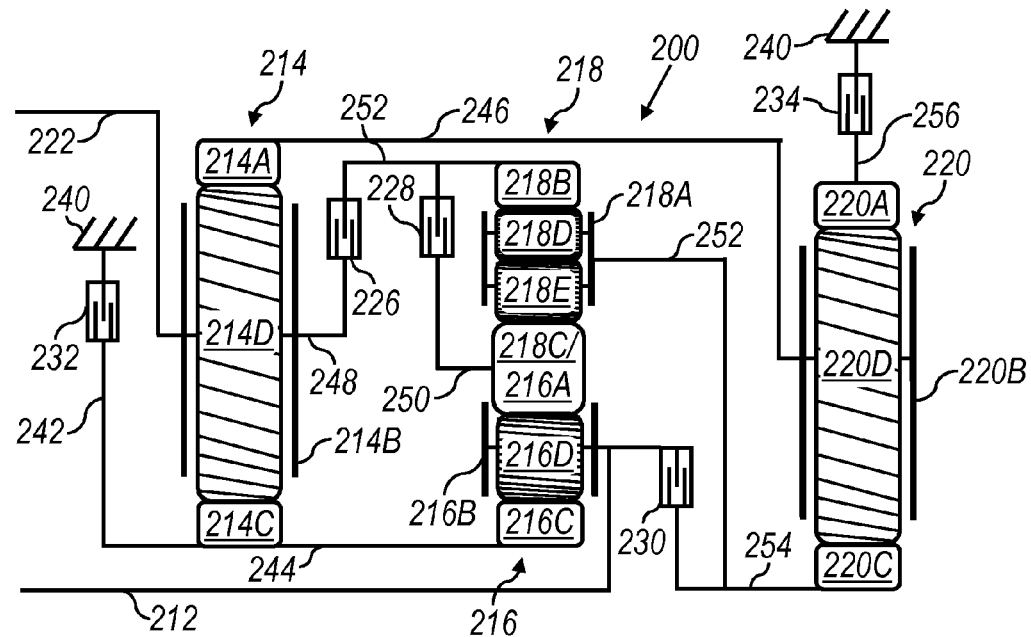
FIG. 8 is a diagrammatic view of an embodiment of an eight speed transmission according to the present invention.

Referring now to FIG. 8, a stick diagram presents a schematic layout of the embodiment of the eight speed transmission 200 according to the present invention. In FIG. 8, the numbering from the lever diagram of FIG. 7 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 214 includes a sun gear member 214C, a ring gear member 214A and a planet gear carrier member 214B that rotatably supports a set of planet gears 214D (only one of which is shown). The sun gear member 214C is connected for common rotation with a first shaft or interconnecting member 242 and with a second shaft or interconnecting member 244. The ring gear member 214A is connected for common rotation with a third shaft or interconnecting member 246. The planet carrier member 214B is connected for common rotation with a fourth shaft or interconnecting member 248 and with the output member 222. The planet gears 214D each are configured to intermesh with both the sun gear member 214C and the ring gear member 214A.

The planetary gear set 216 includes a sun gear member 216C, a ring gear member 216A and a planet gear carrier member 216B that rotatably supports a set of planet gears 216D (only one of which is shown). The sun gear member 216C is connected for common rotation with the second shaft or interconnecting member 244. The ring gear member 216A is connected for common rotation with a fifth shaft or interconnecting member 250. The planet carrier member 216B is connected for common rotation with the input member 212. The planet gears 216D each are configured to intermesh with both the sun gear member 216C and the ring gear member 216A.

The planetary gear set 218 includes a sun gear member 218C, a ring gear member 218B and a planet gear carrier member 218A that rotatably supports a first set of planet gears 218D (only one of which is shown) and a second set of planet gears 218E (only one of which is shown). The sun gear member 218C is connected for common rotation with the fifth shaft or interconnecting member 250. In a preferred embodiment of the present invention, the sun gear member 218C is integrally formed with the ring gear member 216A of the planetary gear set 216. The ring gear member 218B is connected for common rotation with a sixth shaft or interconnecting member 252. The planet carrier member 218A is connected for common rotation with a seventh shaft or interconnecting member 254. The planet gears 218D each are configured to intermesh with both the planet gears 218E and the ring gear member 218B. The planet gears 218E each are configured to intermesh with both the planet gears 218D and the sun gear member 218C.

The planetary gear set 220 includes a sun gear member 220C, a ring gear member 220A and a planet gear carrier member 220B that rotatably supports a set of planet gears 220D (only one of which is shown). The sun gear member 220C is connected for common rotation with the seventh shaft or interconnecting member 254. The ring gear member 220A is connected for common rotation with an eighth shaft or interconnecting member 256. The planet carrier member 220B is connected for common rotation with the third shaft or interconnecting member 246. The planet gears 220D each are configured to intermesh with both the sun gear member 220C and the ring gear member 220A.

In the preferred embodiment of the present invention, the sun gear member 218C is integrally formed with the ring gear member 216A of the planetary gear set 216 such that the sun gear member 218C is located on an outer surface and the ring gear member 216A is located on an inner surface of the same member. Moreover, the sun gear member 218C defines an internal cavity and the planetary gear set 216 is disposed within the internal cavity (i.e., the planetary gear set 218 is radially stacked with the planetary gear set 216 such that the planetary gear set 216 is nested within the planetary gear set 218). However, it should be appreciated that the sun gear member 218C and the ring gear member 216A may be separate components connected by an interconnecting member without departing from the scope of the present invention.

The input shaft or member 212 is continuously connected to an engine (not shown) or to a turbine of a torque converter (not shown). The output shaft or member 222 is continuously connected with the final drive unit or transfer case (not shown).

The torque-transmitting mechanisms or clutches 226, 228, and 230 and brakes 232 and 234 allow for selective interconnection of the shafts or interconnecting members, members of the planetary gear sets and the housing. For example, the first clutch 226 is selectively engageable to connect the fourth shaft or interconnecting member 248 and the output member 222 with the sixth shaft or interconnecting member 252. The second clutch 228 is selectively engageable to connect the fifth shaft or interconnecting member 250 with the sixth shaft or interconnecting member 252. The third clutch 230 is selectively engageable to connect the input shaft or member 212 with the seventh shaft or interconnecting member 254. The first brake 232 is selectively engageable to connect the first shaft or interconnecting member 242 and the second shaft or interconnecting member 244 with the stationary member or the transmission housing 240 in order to restrict the members 242, 244 from rotating relative to the transmission housing 240. The second brake 234 is selectively engageable to connect the eighth shaft or interconnecting member 256 with the stationary member or the transmission housing 240 in order to restrict the eighth interconnecting member 256 from rotating relative to the transmission housing 240.

Referring now to FIG. 8 and FIG. 9, the operation of the embodiment of the eight speed transmission 200 will be described. It will be appreciated that transmission 200 is capable of transmitting torque from the input shaft or member 212 to the output shaft or member 222 in at least eight forward speed or torque ratios and at least one reverse speed or torque ratio with single transition sequential shifts and a double overdrive. Each forward and reverse speed or torque ratio is attained by engagement of one or more of the torque-transmitting mechanisms (i.e. first clutch 226, second clutch 228, third clutch 230, first brake 232 and second brake 234), as will be explained below. FIG. 9 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 9. Of course, other gear ratios are achievable depending on the gear diameter, gear teeth count and gear configuration selected.

To establish a reverse gear, the first clutch 226, first brake 232 and second brake 234 are engaged or activated. For example, the first clutch 226 connects the fourth shaft or interconnecting member 248 and the output member 222 with the sixth shaft or interconnecting member 252. The first brake 232 connects the first shaft or interconnecting member 242 and the second shaft or interconnecting member 244 with the stationary member or the transmission housing 240 in order to restrict the members 242, 244 from rotating relative to the transmission housing 240. The second brake 234 connects the eighth shaft or interconnecting member 256 with the stationary member or the transmission housing 240 in order to restrict the eighth interconnecting member 256 from rotating relative to the transmission housing 240. Likewise, the eight forward ratios are achieved through different combinations of clutch and brake engagement, as shown in FIG. 9.

It will be appreciated that the foregoing explanation of operation and gear states of the eight speed transmission 200 assumes, first of all, that all the clutches or brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

We claim the following:

1. A transmission comprising:
   an input member;
   an output member;
   first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to the second member of the first planetary gear set and the second member of the third planetary gear set;
   a first interconnecting member continuously interconnecting the first member of the first planetary gear set with the second member of the fourth planetary gear set;
   a second interconnecting member continuously interconnecting the second member of the first planetary gear set with the second member of the third planetary gear set;
   a third interconnecting member continuously interconnecting the third member of the first planetary gear set with the third member of the second planetary gear set; and
   five torque transmitting mechanisms selectively engageable to interconnect one of the first, second, and third members with another of the first, second, third members and a stationary member, and
   wherein the torque transmitting mechanisms are selectively engageable in combinations of at least three to establish at least eight forward speed ratios and at least one reverse speed ratio between the input member and the output member.

2. The transmission of claim 1 wherein a first of the five torque transmitting mechanisms is selectively engageable to interconnect the first member of the third planetary gear set with the third member of the fourth planetary gear set.

3. The transmission of claim 2 wherein a second of the five torque transmitting mechanisms is selectively engageable to interconnect the first member of the second planetary gear set and the third member of the third planetary gear set with the third member of the fourth planetary gear set.

4. The transmission of claim 3 wherein a third of the five torque transmitting mechanisms is selectively engageable to interconnect at least one of the input member and the second member of the second planetary gear set with the third member of the fourth planetary gear set.

5. The transmission of claim 4 wherein a fourth of the five torque transmitting mechanisms is selectively engageable to interconnect the third member of the first planetary gear set and the third member of the second planetary gear set with the stationary member.

6. The transmission of claim 5 wherein a fifth of the five torque transmitting mechanisms is selectively engageable to interconnect the first member of the fourth planetary gear set with the stationary member.

7. The transmission of claim 1 wherein the third members of the first, second, third, and fourth planetary gear sets are sun gears, the second members of the first, second, third, and fourth planetary gear sets are carrier members, and the first members of the first, second, third, and fourth planetary gear sets are ring gears.

8. The transmission of claim 1 wherein two of the torque transmitting mechanisms are brakes for connecting a plurality of the first, second, and third members to the stationary member and three of the torque transmitting mechanisms are clutches for connecting a set of the first, second, and third members to another set of the first, second, and third members.

9. A transmission comprising:
   an input member;
   an output member;
   first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to of the second member of the first planetary gear set and the second member of the third planetary gear set;
   a first interconnecting member continuously interconnecting the first member of the first planetary gear set with the second member of the fourth planetary gear set;
   a second interconnecting member continuously interconnecting the second member of the first planetary gear set with the second member of the third planetary gear set;
   a third interconnecting member continuously interconnecting the third member of the first planetary gear set with the third member of the second planetary gear set;
   a first torque transmitting mechanism selectively engageable to interconnect the first member of the third planetary gear set with the third member of the fourth planetary gear set;
   a second torque transmitting mechanism selectively engageable to interconnect the first member of the second planetary gear set and the third member of the third planetary gear set with the third member of the fourth planetary gear set;
   a third torque transmitting mechanism selectively engageable to interconnect the input member and the second member of the second planetary gear set with the third member of the fourth planetary gear set;
a fourth torque transmitting mechanism selectively engageable to interconnect the third member of the first planetary gear set and the third member of the second planetary gear set with a stationary member; and
a fifth torque transmitting mechanism selectively engageable to interconnect the first member of the fourth planetary gear set with the stationary member, and
wherein the torque transmitting mechanisms are selectively engageable in combinations of at least three to establish at least eight forward speed ratios and at least one reverse speed ratio between the input member and the output member.

10. The transmission of claim 9 wherein the third members of the first, second, third, and fourth planetary gear sets are sun gears, the second members of the first, second, third, and fourth planetary gear sets are carrier members, and the first members of the first, second, third, and fourth planetary gear sets are ring gears.

11. A transmission comprising:
an input member;
an output member;
first, second, third, and fourth planetary gear sets each having a sun gear member, a carrier member, and a ring gear member, wherein the sun gear member of the third planetary gear set is formed on an outer surface of the ring gear member of the second planetary gear set, wherein the sun gear member of the third planetary gear set includes an inner surface that defines an internal cavity, wherein the sun gear member, carrier member, and ring gear member of the second planetary gear set are disposed within the internal cavity, and wherein the input member is continuously interconnected to the carrier member of the second planetary gear set and the output member is continuously interconnected to the carrier member of the first planetary gear set and the carrier member of the third planetary gear set;
a first interconnecting member continuously interconnecting the ring gear member of the first planetary gear set with the carrier member of the fourth planetary gear set;
a second interconnecting member continuously interconnecting the carrier member of the first planetary gear set with the carrier member of the third planetary gear set;
a third interconnecting member continuously interconnecting the sun gear member of the first planetary gear set with the sun gear member of the second planetary gear set;
a first torque transmitting mechanism selectively engageable to interconnect the ring gear member of the third planetary gear set with the sun gear member of the fourth planetary gear set;
a second torque transmitting mechanism selectively engageable to interconnect the ring gear member of the second planetary gear set and the sun gear member of the third planetary gear set with the sun gear member of the fourth planetary gear set;
a third torque transmitting mechanism selectively engageable to interconnect the input member and the carrier member of the second planetary gear set with the sun gear member of the fourth planetary gear set;
a fourth torque transmitting mechanism selectively engageable to interconnect the sun gear member of the first planetary gear set and the sun gear member of the second planetary gear set with a stationary member; and
a fifth torque transmitting mechanism selectively engageable to interconnect the ring gear member of the fourth planetary gear set with the stationary member, and
wherein the torque transmitting mechanisms are selectively engageable in combinations of at least three to establish at least eight forward speed ratios and at least one reverse speed ratio between the input member and the output member.

12. A transmission comprising:
an input member;
an output member;
first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to the second member of the first planetary gear set and the first member of the third planetary gear set;
a first interconnecting member continuously interconnecting the first member of the first planetary gear set with the second member of the fourth planetary gear set;
a second interconnecting member continuously interconnecting the second member of the first planetary gear set with the first member of the third planetary gear set;
a third interconnecting member continuously interconnecting the third member of the first planetary gear set with the third member of the second planetary gear set; and
five torque transmitting mechanisms each selectively engageable to interconnect one of the first, second, and third members with another of the first, second, third members and a stationary member, and
wherein the torque transmitting mechanisms are selectively engageable in combinations of at least three to establish at least eight forward speed ratios and at least one reverse speed ratio between the input member and the output member.

13. The transmission of claim 12 wherein a first of the five torque transmitting mechanisms is selectively engageable to interconnect the second member of the third planetary gear set with the third member of the fourth planetary gear set.

14. The transmission of claim 13 wherein a second of the five torque transmitting mechanisms is selectively engageable to interconnect the first member of the second planetary gear set and the third member of the third planetary gear set with the third member of the fourth planetary gear set.

15. The transmission of claim 14 wherein a third of the five torque transmitting mechanisms is selectively engageable to interconnect the input member and the second member of the second planetary gear set with the third member of the fourth planetary gear set.

16. The transmission of claim 15 wherein a fourth of the five torque transmitting mechanisms is selectively engageable to interconnect the third member of the first planetary gear set and the third member of the second planetary gear set with the stationary member.

17. The transmission of claim 16 wherein a fifth of the five torque transmitting mechanisms is selectively engageable to interconnect the first member of the fourth planetary gear set with the stationary member.

18. The transmission of claim 12 wherein the third members of the first, second, third, and fourth planetary gear sets are sun gears, the second members of the first, second, third, and fourth planetary gear sets are carrier members, and the first members of the first, second, third, and fourth planetary gear sets are ring gears.

19. The transmission of claim 12 wherein two of the torque transmitting mechanisms are brakes for connecting a plurality of the first, second, and third members to the stationary member and three of the torque transmitting mechanisms are clutches for connecting a set of the first, second, and third members to another set of the first, second, and third members.

20. A transmission comprising:
an input member;
an output member;
first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to the second member of the first planetary gear set and the first member of the third planetary gear set;
a first interconnecting member continuously interconnecting the first member of the first planetary gear set with the second member of the fourth planetary gear set;
a second interconnecting member continuously interconnecting the second member of the first planetary gear set with the first member of the third planetary gear set;
a third interconnecting member continuously interconnecting the third member of the first planetary gear set with the third member of the second planetary gear set;
a first torque transmitting mechanism selectively engageable to interconnect the second member of the third planetary gear set with the third member of the fourth planetary gear set;
a second torque transmitting mechanism selectively engageable to interconnect the first member of the second planetary gear set and the third member of the third planetary gear set with the third member of the fourth planetary gear set;
a third torque transmitting mechanism selectively engageable to interconnect the input member and the second member of the second planetary gear set with the third member of the fourth planetary gear set;
a fourth torque transmitting mechanism selectively engageable to interconnect the third member of the first planetary gear set and the third member of the second planetary gear set with a stationary member; and
a fifth torque transmitting mechanism selectively engageable to interconnect the first member of the fourth planetary gear set with the stationary member, and
wherein the torque transmitting mechanisms are selectively engageable in combinations of at least three to establish at least eight forward speed ratios and at least one reverse speed ratio between the input member and the output member.

21. The transmission of claim 20 wherein the third members of the first, second, third, and fourth planetary gear sets are sun gears, the second members of the first, second, third, and fourth planetary gear sets are carrier members, and the first members of the first, second, third, and fourth planetary gear sets are ring gears.

22. A transmission comprising:
an input member;
an output member;
first, second, third, and fourth planetary gear sets each having a sun gear member, a carrier member, and a ring gear member, wherein the sun gear member of the third planetary gear set is formed on an outer surface of the ring gear member of the second planetary gear set, wherein the sun gear member of the third planetary gear set includes an inner surface that defines an internal cavity, wherein the sun gear member, carrier member, and ring gear member of the second planetary gear set are disposed within the internal cavity, and wherein the input member is continuously interconnected to the carrier member of the second planetary gear set and the output member is continuously interconnected to the carrier member of the first planetary gear set and the ring gear member of the third planetary gear set;
a first interconnecting member continuously interconnecting the ring gear member of the first planetary gear set with the carrier member of the fourth planetary gear set;
a second interconnecting member continuously interconnecting the carrier member of the first planetary gear set with the ring gear member of the third planetary gear set;
a third interconnecting member continuously interconnecting the sun gear member of the first planetary gear set with the sun gear member of the second planetary gear set;
a first torque transmitting mechanism selectively engageable to interconnect the carrier member of the third planetary gear set with the sun gear member of the fourth planetary gear set;
a second torque transmitting mechanism selectively engageable to interconnect the ring gear member of the second planetary gear set and the sun gear member of the third planetary gear set with the sun gear member of the fourth planetary gear set;
a third torque transmitting mechanism selectively engageable to interconnect the input member and the carrier member of the second planetary gear set with the sun gear member of the fourth planetary gear set;
a fourth torque transmitting mechanism selectively engageable to interconnect the sun gear member of the first planetary gear set and the sun gear member of the second planetary gear set with a stationary member; and
a fifth torque transmitting mechanism selectively engageable to interconnect the ring gear member of the fourth planetary gear set with the stationary member, and
wherein the torque transmitting mechanisms are selectively engageable in combinations of at least three to establish at least eight forward speed ratios and at least one reverse speed ratio between the input member and the output member.

23. A transmission comprising:
an input member;
an output member;
first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to the second member of the first planetary gear set;

a first interconnecting member continuously interconnecting the first member of the first planetary gear set with the second member of the fourth planetary gear set;

a second interconnecting member continuously interconnecting the first member of the third planetary gear set with the third member of the fourth planetary gear set;

a third interconnecting member continuously interconnecting the third member of the first planetary gear set with the third member of the second planetary gear set; and five torque transmitting mechanisms each selectively engageable to interconnect one of the first, second, and third members with another of the first, second, third members and a stationary member, and wherein the torque transmitting mechanisms are selectively engageable in combinations of at least three to establish at least eight forward speed ratios and at least one reverse speed ratio between the input member and the output member.

24. The transmission of claim 23 wherein a first of the five torque transmitting mechanisms is selectively engageable to interconnect the output member and the second member of the first planetary gear set with the second member of the third planetary gear set.

25. The transmission of claim 24 wherein a second of the five torque transmitting mechanisms is selectively engageable to interconnect the third member of the third planetary gear set and the first member of the second planetary gear set with the second member of the third planetary gear set.

26. The transmission of claim 25 wherein a third of the five torque transmitting mechanisms is selectively engageable to interconnect the input member and the second member of the second planetary gear set with the third member of the fourth planetary gear set.

27. The transmission of claim 26 wherein a fourth of the five torque transmitting mechanisms is selectively engageable to interconnect the third member of the first planetary gear set and the third member of the second planetary gear set with the stationary member.

28. The transmission of claim 27 wherein a fifth of the five torque transmitting mechanisms is selectively engageable to interconnect the first member of the fourth planetary gear set with the stationary member.

29. The transmission of claim 23 wherein the third members of the first, second, third, and fourth planetary gear sets are sun gears, the second members of the first, second, and fourth planetary gear sets and the first member of the third planetary gear set are carrier members, and the first members of the first, second, and fourth planetary gear sets and the second member of the third planetary gear set are ring gears.

30. The transmission of claim 23 wherein two of the torque transmitting mechanisms are brakes for connecting a plurality of the first, second, and third members to the stationary member and three of the torque transmitting mechanisms are clutches for connecting a set of the first, second, and third members to another set of the first, second, and third members.

31. A transmission comprising:
an input member;
an output member;
first, second, third, and fourth planetary gear sets each having first, second and third members, wherein the third member of the third planetary gear set is formed on an outer surface of the first member of the second planetary gear set, wherein the third member of the third planetary gear set includes an inner surface that defines an internal cavity, wherein the first, second, and third members of the second planetary gear set are disposed within the internal cavity, and wherein the input member is continuously interconnected to the second member of the second planetary gear set and the output member is continuously interconnected to the second member of the first planetary gear set;

a first interconnecting member continuously interconnecting the first member of the first planetary gear set with the second member of the fourth planetary gear set;

a second interconnecting member continuously interconnecting the first member of the third planetary gear set with the third member of the fourth planetary gear set;

a third interconnecting member continuously interconnecting the third member of the first planetary gear set with the third member of the second planetary gear set;

a first torque transmitting mechanism selectively engageable to interconnect the output member and the second member of the first planetary gear set with the second member of the third planetary gear set;

a second torque transmitting mechanism selectively engageable to interconnect the third member of the third planetary gear set and the first member of the second planetary gear set with the second member of the third planetary gear set;

a third torque transmitting mechanism selectively engageable to interconnect the input member and the second member of the second planetary gear set with the third member of the fourth planetary gear set;

a fourth torque transmitting mechanism selectively engageable to interconnect the third member of the first planetary gear set and the third member of the second planetary gear set with a stationary member; and a fifth torque transmitting mechanism selectively engageable to interconnect the first member of the fourth planetary gear set with the stationary member, and wherein the torque transmitting mechanisms are selectively engageable in combinations of at least three to establish at least eight forward speed ratios and at least one reverse speed ratio between the input member and the output member.

32. The transmission of claim 31 wherein the third members of the first, second, third, and fourth planetary gear sets are sun gears, the second members of the first, second, and fourth planetary gear sets and the first member of the third planetary gear set are carrier members, and the first members of the first, second, and fourth planetary gear sets and the second member of the third planetary gear set are ring gears.

33. A transmission comprising:
an input member;
an output member;
first, second, third, and fourth planetary gear sets each having a sun gear member, a carrier member, and a ring gear member, wherein the sun gear member of the third planetary gear set is formed on an outer surface of the ring gear member of the second planetary gear set, wherein the sun gear member of the third planetary gear set includes an inner surface that defines an internal cavity, wherein the sun gear member, carrier member, and ring gear member of the second planetary gear set are disposed within the internal cavity, and wherein the input member is continuously interconnected to the carrier member of the second planetary gear set and the output member is continuously interconnected to the carrier member of the first planetary gear set;

a first interconnecting member continuously interconnecting the ring gear member of the first planetary gear set with the carrier member of the fourth planetary gear set;

a second interconnecting member continuously interconnecting the carrier member of the third planetary gear set with the sun gear member of the fourth planetary gear set;

a third interconnecting member continuously interconnecting the sun gear member of the first planetary gear set with the sun gear member of the second planetary gear set;

a first torque transmitting mechanism selectively engageable to interconnect the output member and the carrier member of the first planetary gear set with the ring gear member of the third planetary gear set;

a second torque transmitting mechanism selectively engageable to interconnect the sun gear member of the third planetary gear set and the ring gear member of the second planetary gear set with the ring gear member of the third planetary gear set;

a third torque transmitting mechanism selectively engageable to interconnect the input member and the carrier member of the second planetary gear set with the sun gear member of the fourth planetary gear set;

a fourth torque transmitting mechanism selectively engageable to interconnect the sun gear member of the first planetary gear set and the sun gear member of the second planetary gear set with a stationary member; and a fifth torque transmitting mechanism selectively engageable to interconnect the ring gear member of the fourth planetary gear set with the stationary member, and wherein the torque transmitting mechanisms are selectively engageable in combinations of at least three to establish at least eight forward speed ratios and at least one reverse speed ratio between the input member and the output member.

\* \* \* \* \*